United States Patent

Prather et al.

[11] 3,945,473
[45] Mar. 23, 1976

[54] INDIVIDUALIZED STATOR AND ROTOR FOR HYDROMATIC BRAKES

[75] Inventors: George A. Prather; Steve A. Braschler, both of Coffeyville, Kans.

[73] Assignee: Parmac, Inc., Coffeyville, Kans.

[22] Filed: May 28, 1974

[21] Appl. No.: 474,045

Related U.S. Application Data

[63] Continuation-in-part of Ser. No. 277,669, Aug. 3, 1972, Pat. No. 3,860,097.

[52] U.S. Cl. .................... 188/296; 60/363; 73/134; 192/3.23; 192/3.34
[51] Int. Cl.² ......................................... F16D 57/04
[58] Field of Search ...... 188/296; 73/134; 192/3.23, 192/3.34; 60/330, 363, 364

[56] References Cited
UNITED STATES PATENTS

| | | | |
|---|---|---|---|
| 2,218,463 | 10/1940 | Bennett | 188/296 |
| 3,166,161 | 1/1965 | Hayes | 188/296 |

FOREIGN PATENTS OR APPLICATIONS

| | | | |
|---|---|---|---|
| 734,024 | 7/1955 | United Kingdom | 188/296 |
| 342,049 | 12/1959 | Switzerland | 60/364 |
| 802,030 | 2/1951 | Germany | 188/296 |

Primary Examiner—George E. A. Halvosa
Attorney, Agent, or Firm—Head & Johnson

[57] ABSTRACT

This invention describes an improved type of hydromatic brake in which the stators and rotors are prepared as individual items and the assembly is designed so that one, two, three or more sets of individual stators and rotors can be assembled inside a housing. The housing comprises a pair of end walls. Each stator has an outwardly extending planar annular flange which is clamped between the two end walls at their outer rim to provide a closed housing. When more than one stator is used an additional tubular flanged spacing element is provided, and two stators are clamped, one on each end of the annular tubular spacing element and the end walls are clamped to the stators. A second important feature of this invention lies in the design of the stator which carries an overhanging lip or peripheral rim into which the rotor fits. There is a selected radial clearance between the outer circumference of the rotor and the inner radius of the lip. This clearance gap is designed to provide the optimum resistance to liquid flow through the brake.

1 Claim, 5 Drawing Figures

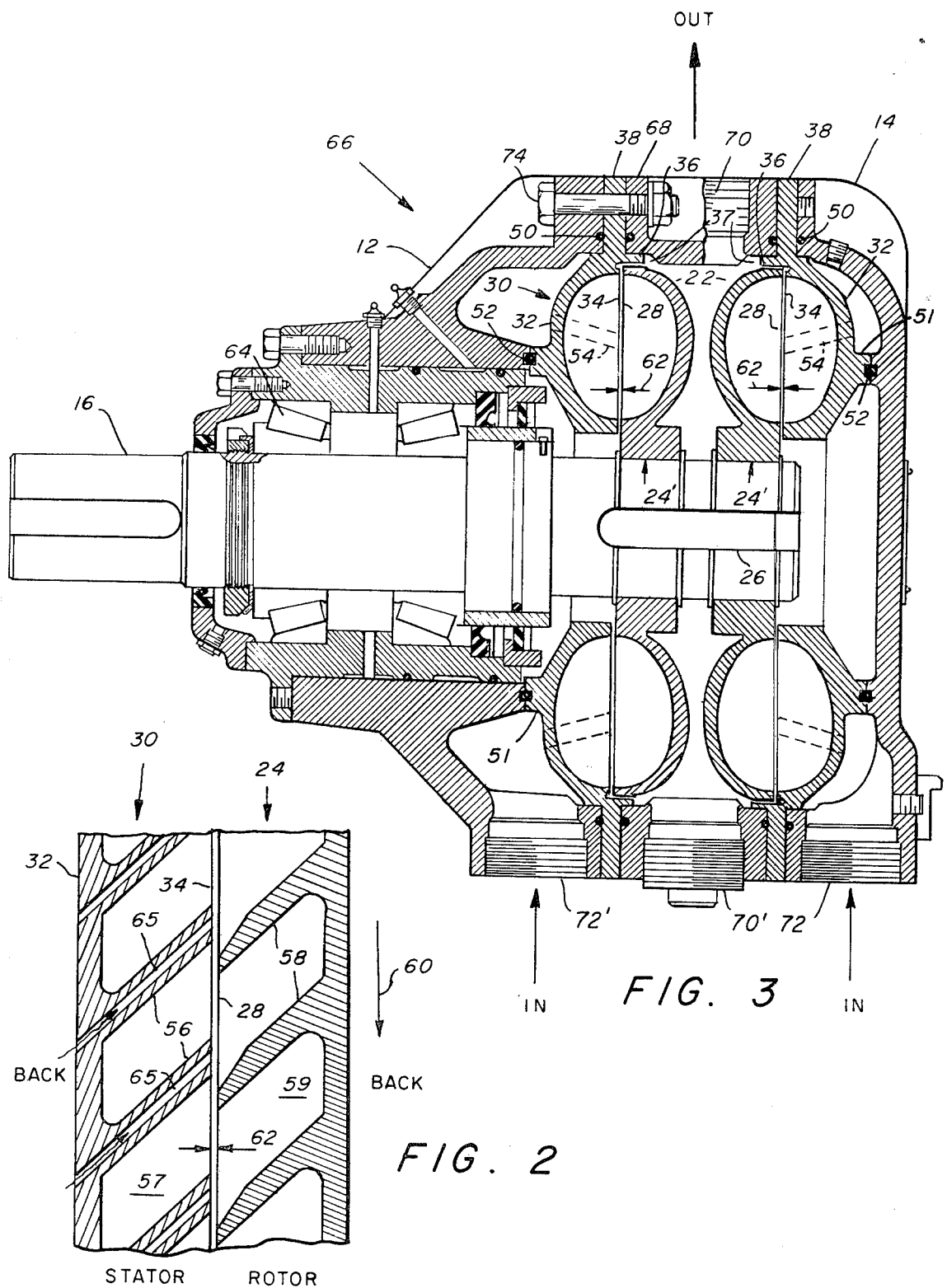

INDIVIDUALIZED STATOR AND ROTOR FOR HYDROMATIC BRAKES

CROSS REFERENCE TO RELATED APPLICATION

This application is a continuation-in-part of our copending application Ser. No. 277,669, filed Aug. 3, 1972, entitled "Individualized Stator and Rotor for Hydromatic Brakes now U.S. Pat. No. 3,860,097."

BACKGROUND AND SUMMARY OF THE INVENTION

This invention lies in the field of liquid hydromatic brake systems. More particularly, it is concerned with a hydromatic brake assembly that is made out of a single pair or a plurality of pairs of unitary rotor and stator elements which can be housed inside a pair of end walls to provide brakes of different braking capacity by the addition or subtraction of pairs of rotor-stator pairs.

Hydromatic brakes have been known and used heretofore in automotive and truck equipments and for dynamometer purposes. They have also been used in oil well drilling operations as a control over the hoist mechanism when large and heavy strings of drill pipe are being lowered into the bore hole into the earth. The continued use of conventional friction brakes has provided to be unsatisfactory so that the use of hydromatic brakes has increased in recent years.

The design of hydromatic brakes and power absorbers is well known and these have been widely used in several of the dynamic vehicle arts.

In general they comprise a pair of relatively rotating members. One of them is fastened to a rotating shaft, the other is held stationary with respect to a housing which supports the shaft rotatably in appropriate bearings. Each of the rotor and stator elements includes an annular cavity, the cross section being in the shape of approximately a half circle. There are a plurality of vanes inserted across the cavity. These are generally inclined at an angle of approximately 45°. In the rotor cavity they are directed in the direction of rotation of the rotor. In the stator cavity the vanes are directed against the direction of rotation. The cavities of the rotor and stator are substantially mirror images of each other, and the two elements are face to face with a relatively narrow selected spacing between the two elements.

There are a plurality of holes that are drilled through the stator vanes and through the back portion of the stator elements. The housing is designed to provide a space behind the stator for inlet liquid, which flows from the inlet liquid space through these holes in the vanes into the center formed by the two cavities in the stator and rotor elements. The vanes tend to cause a very high degree of turbulence in the brake liquid, which turbulence generates energy loss and heat which tends to raise the temperature of the liquid. In the prior art the liquid flows out of the cavities through the space between the two elements and into an exit pipe or conduit. It then goes to a heat transfer device where the liquid is cooled and returned back into the inlet liquid space to be passed again through the cavity.

In the prior art the designs have been based on controlling the flow of liquid through the apparatus by means of adjustment (by shims or otherwise) of the spacing between the rotor and the stator. In this device the controlling gap through which the liquid flows, is in the annular space between the outer circumference of the rotor and the inner face of the overhanging lip. Since these can be machined precisely before assembly, there is no need for any means to adjust this gap spacing and therefore the apparatus is much more simple to assemble. Also, in this improved apparatus the system of multiple rotors and stators is made up of a desired plurality of identical single rotor and stator elements and stacking them up axially with proper spacing, etc. to assemble a unit of as large a capacity as may be desired.

In this design the stator has a planar annular flange on the outside of the lip which is clamped between a pair of end walls to provide a closed housing around the stator and a rotor, which can be assembled on a shaft inside of the housing. Where more than a single pair of rotors and stator is required additional space is provided by means of short cylindrical flanged tubes of appropriate length, which are placed between the separate stator flanges to complete the housing. All parts are bolted longitudinally to provide a closed container.

Heretofore hydrodynamic brakes were usually designed at fairly fixed and few load ratings. The intricacy of the castings for the stator and rotor required that a user adopt a brake which may be substantially more than the actual design load requirements. In this invention the entire assembly is simplified and there is considerably greater ease of assembling, without entire redesign of units of various numbers of stators and rotors to provide increased or reduced capacity.

It is a primary object of this invention to provide a design of hydromatic brake which utilizes one or more pairs of identical unitary single rotor elements corresponding single stator elements, assembled in selected numbers of pairs and spaced axially of each other to provide brake systems of different braking capacity.

It is a further object of this invention to provide a design of rotor and stator in which the resistance to flow of liquid through the hydromatic brake is controlled by the original machining of the rotor and stator instead of having to be adjusted individually during the assembly operation.

It is a still further object to provide a design of hydromatic brake having two rotors and two stators, and which can be generated in the reverse direction of shaft rotation simply by interchanging the positions of stators and rotors.

These and other objects are realized and the limitations of the prior art are overcome in this invention.

BRIEF DESCRIPTION OF THE DRAWINGS

These and other objects of the invention and a better understanding of the principles and details of the invention will be evident from the following description, taken in conjunction with the appended drawings, in which:

FIG. 2 illustrates in cross section the design of the vanes and pockets inside of the cavities of the rotor and stator.

FIG. 3 illustrates a larger power output brake in which there are two pairs of rotors and stators.

DESCRIPTION OF THE PREFERRED EMBODIMENT

Before explaining the present invention in detail it is to be understood that the invention is not limited in its application to the details of construction and arrangement of parts illustrated in the accompanying drawings since the invention is capable of other embodiments and of being practiced or carried out in various other ways. It is also to be understood that the phraseology or terminology employed in describing the embodiments herein is for the purpose of description and not of limitation. For the purpose of description herein like members, or like parts, in the different views have the same number.

Figure 1:
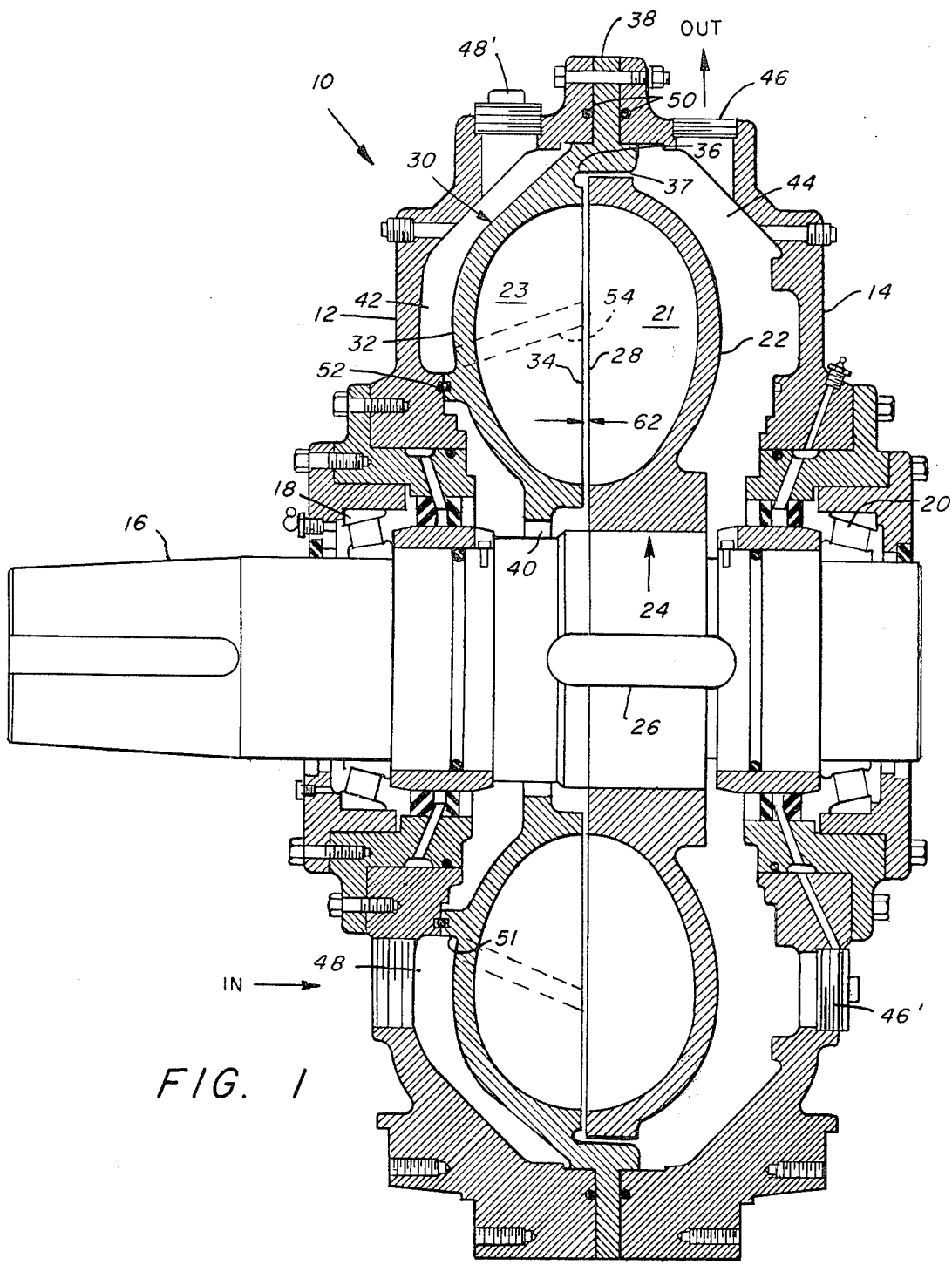
FIG. 1 represents a small power hydromatic brake utilizing only a single rotor element and a single stator element.

Referring now to FIG. 1 the number 10 indicates generally the hydromatic brake of this invention. It has a housing which comprises essentially two end walls 12 and 14 each of which have bearings 18 and 20 respectively which support a shaft 16 in rotational relationship in the bearings. There is a rotor element 24 which is fixed to the shaft and locked by means of a key 26. The rotor element is designed to provide an annular cavity 21 formed by a wall having a back surface 22 and a front surface 28 which is plane. There is a corresponding stator element 30 which likewise has an annular cavity 23 which is formed by a wall having a back surface 32 and a front surface 34. The two cavities are substantially mirror images of each other. The front face 28 of the rotor and the front face 34 of the stator are both plane and parallel and in the assembly, are spaced apart a distance 62 which is generally of small selected dimension. The stator is designed with a lip 36 which extends beyond the face 34 and is of larger inside diameter than the outer diameter of the rotor, so that there will be a radial gap 37 of selected dimension. Since the two cylindrical surfaces can be precisely machined, the gap 37 can be adjusted to any desired value and it is this gap which is designed to provide the frictional restraint to the flow of liquid through the brake and to provide back pressure to keep the cavities full.

In prior art devices the restraint was provided by the gap 62 and there was no way of adjusting this except by providing shims, or other means, to displace one part with respect to the other to adjust this gap. In this invention there is no way of adjusting the gap except by the original machining operations so that assembly is very rapid. As a result, the dimension 62 is not critical. It is the dimension of the gap 37 which is critical and is under easy control.

Referring to FIG. 2 in which is shown in partial cross section the stator 30 and the rotor 24 with their faces 34 and 28 in close parallel spacing. There are a plurality of vanes 56 in the stator and 58 in the rotor which break up the annular cavity into a plurality of small pockets 57 and 59 respectively. The rotor turns in the direction of the arrow 60 with respect to the stator which is stationary. The vanes 58 of the rotor are tilted (approximately at an angle of 45°) in the direction of rotation, while the vanes 56 of the stator are turned against the direction of rotation by an equal angle.

In each of the vanes 56 of the stator there is drilled a hole 65 through the vanes from the front surface 34 to the back surface 32 of the stator. Liquid flows from the space back of the stator into these tubes and into the pockets of the rotor and stator. Referring again to FIG. 1 there are dashed lines 54 which are intended to show the holes 65 drilled through the vanes of the stator elements. The stator element is designed with a circumferential planar flange 38 on its outer edge, and is machined such that it can be clamped tightly and sealed by means of O-rings 50, between the end walls 12 and 14. The back side of stator 23 also includes a grooved circumferential lip 51 which, in this embodiment, receives O-ring 52 to seal the stator to the housing end wall 12.

Openings 48 and 48' lead to the space behind the stator, and inlet liquid can flow through either the openings 48 or 48', as desired. This liquid will pass through the openings 65 and into the cavity, and in the pockets in the rotor and stator 57 and 59. As liquid is passed into the cavity it must also pass out and it does this by passing through the gap 62 between the faces 28 and 34, and out through the annular gap 37 between the outer circumference of the rotor and the inner surface of the lip 36 of the stator. It then goes into a space 44 which is the outlet liquid space in contact with the back surface 22 of the rotor. From there it can flow out through the opening 46 or 46' as desired.

In FIG. 1 therefore it has been shown how a hydromatic brake can be assembled with a shaft on which is placed a single rotor element and a single stator element is placed in corresponding face to face position centered, clamped and sealed between two end walls 12 and 14 which provide bearings 18 and 20 respectively to support the shaft 16 which carries the rotor element 24. In FIG. 3 is shown another embodiment in which there are two pairs of rotor and stator elements positioned axially of each other. This brake is illustrated by the numeral 66. It has a first end wall 12 which supports a bearing assembly 64 which is of larger construction than that shown in FIG. 1. Bearing assembly 64 is adapted to support the shaft 16 in such a way that the rotors are supported on a cantilever basis, on the outside of the bearing. While the bearing assembly 64 is more expensive than that of FIG. 1, there is only one bearing assembly required so that the second end wall 14 is of much simpler construction than in FIG. 1.

Two single rotor elements 24' are mounted on the shaft and locked by means of the key 26. These are of slightly different contour of their back surface 22 than that shown in FIG. 1, although this is not a critical matter. Here again, the faces 28 and 34 between the rotor and the stator are spaced apart by the gap 62 as in FIG. 1, and the control of flow is again governed by means of an annular gap 37 between the outer circumference of the rotor elements and the inner face of the overhang 36 of the stator. The stator is again centered, held and sealed between the end wall 12 and end wall 14. However, in order to close and seal the gap between the two stators there is a short cylindrical flanged spacer element 68, of the proper width, which is sealed between the two flanges 38 of the stators and with the two end walls with O-rings 50 to provide the entire housing for the device. Again O-rings 52 are utilized to seal the stator elements to the housings.

No detail is provided of the bearing, the oil seals and the intimate details of the construction since there are conventional in all respects and do not form any part of the invention.

There are a plurality of openings 70 and 70' which connect to the space between the two rotors, and form a conduit for the outflow of liquid from the brake.

There are two openings 72 and 72' which connect respectively to the two input cavities behind the back surfaces 32 of the two stator elements.

Comparing FIG. 3 with FIG. 1 it is seen that the shaft which supports the rotor can be supported in bearing in both end walls or in only one of the end walls. Furthermore, the double capacity of the brake of FIG. 3 is made up of adding an identical pair of rotor and stator elements and providing a short cylindrical spacing portion 68 to the housing of the brake. In both cases the control of the liquid flowing through the brake is gauged by the radial gaps 37 between the rotors and the stators.

Figure 4:
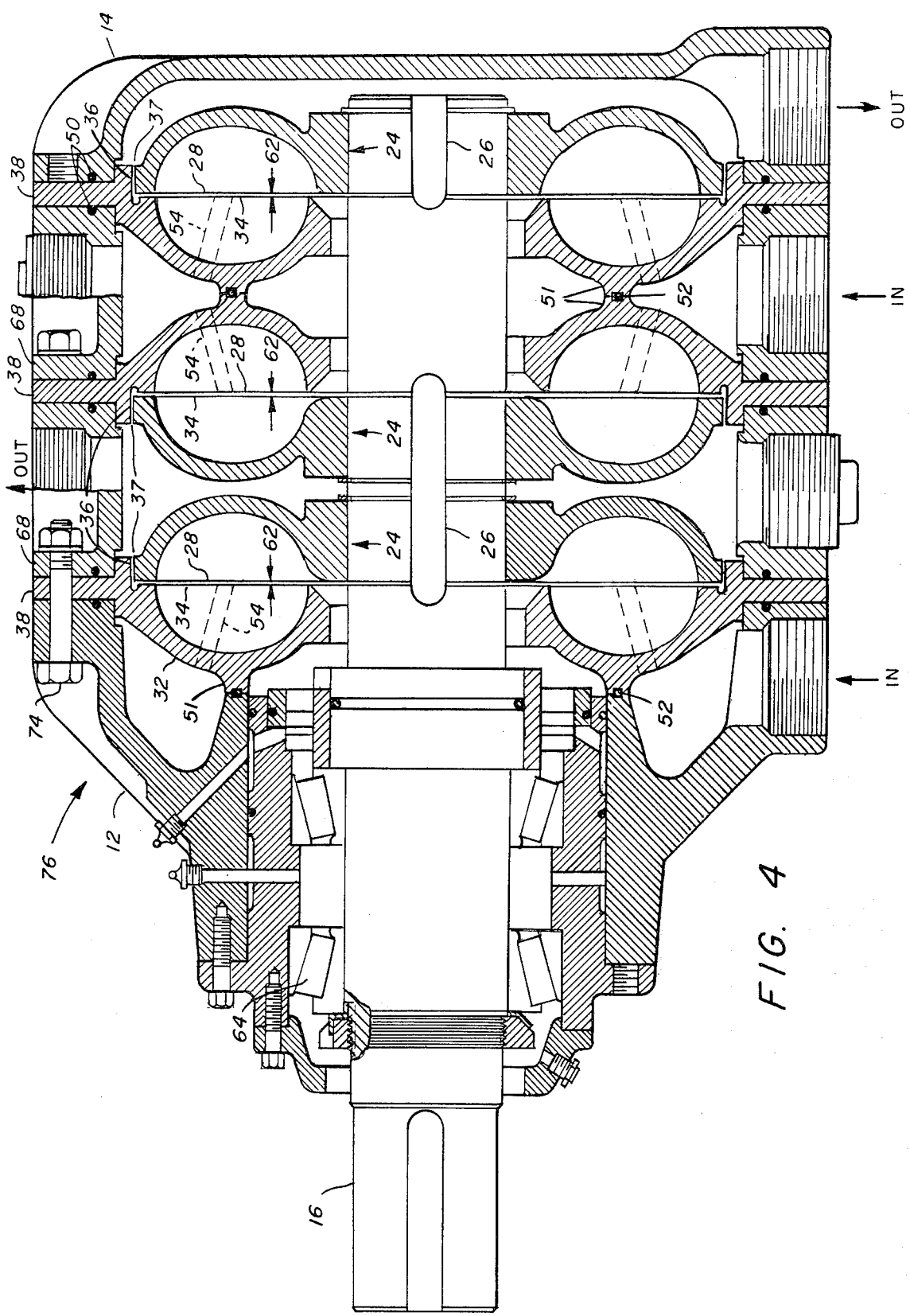
FIG. 4 illustrates a still larger design of hydromatic brake in which there are three pairs of rotor and stator elements.

Referring to FIG. 4 it is seen that the shaft 16 is supported in a bearings assembly 64 substantially identical with that of FIG. 3 and the cantilever shaft carries three sets of rotors 24 and there are three sets of stators, each of which is placed in operating relationship to one of the rotor elements. There are two spacers 68 which are positioned between the flanges 38 of the stator elements and all of them are bolted together to provide a closed housing including the two end walls 12 and 14 as before. Each pair of rotor and stator elements is substantially identical to that of FIG. 1 and of FIG. 2 so that by having one design of rotor element and stator element and one design of spacer 68, it is possible by the choice of the length of the overhang of the shaft 16 beyond the bearing, to make hydromatic brakes of different braking capacity. In this embodiment the circumferential lip 51 of two stators are sealed (with O-ring 52) to each other and one is sealed with housing 12 similar to FIG. 1.

Figure 5:
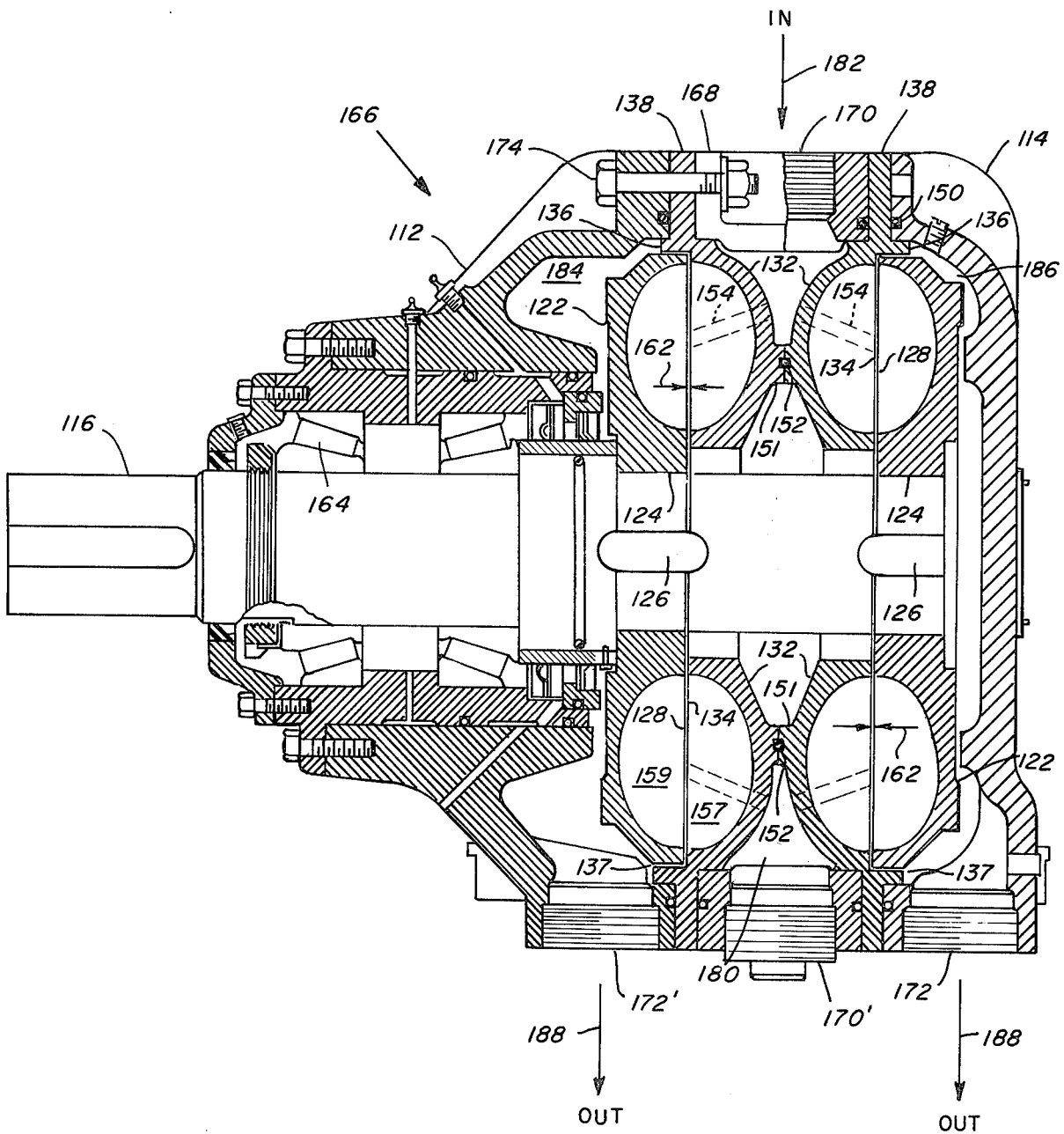
FIG. 5 illustrates a modification of FIG. 3 in which the two stators and rotors are interchanged in position inside the housing, and the direction of rotation of the shaft is reversed.

Referring now to FIG. 5 there is a modification of the brake shown in FIG. 3 comprising two rotor means and two stator means. The rotors are mounted in cantilever manner on a shaft held in a single bearing assembly in the first end wall of the brake.

FIG. 5 differs from the assembly shown in FIG. 3 in that the shaft 116 is adapted to rotate in the opposite direction from the shaft of the brake shown in FIG. 3. The apparatus distinctions are minor. The assembly is different, however, in the fact that the individual rotors and stators are interchanged, so that the two stators are on the inside, mounted back to back, while the two rotors are on the outside with their cavities, or pockets, facing those of their respective stators. By reversing the rotors on the shaft the direction in which their pockets face are in the opposite direction of rotation of the shaft, so that if the shaft is driven in the opposite direction the pockets will be directed in the direction of rotation, which is the proper method of operation. It is therefore seen that by the advantages of the invention, the hydromatic brake can be adapted to rotation of its input shaft in either direction, simply by the expedient of mounting the rotors in one position or in another, in relationship to the stators.

In FIG. 5 the brake is indicated, in general, by the numeral 166. It has two pairs of rotor and stator means positioned axially of each other. It has a first end wall 112 which supports a bearing assembly 164 which is of larger construction than that shown in FIG. 1 but is similar to that shown in FIG. 3. Bearing assembly 164 is adapted to support the shaft 116 in such a way that the rotors are supported on a cantilever basis, on the outside of the bearing. While the bearing assembly 164 is more expensive than that shown in FIG. 1 there is only one bearing assembly required, so that the second end wall 114 is of much simpler construction than in FIG. 1. It will be clear, however, that the second end wall might be constructed with an appropriate bearing so that the shaft 116 can be supported in two bearings, respectively, in the two end walls as shown in FIG. 1.

The two stator means 132 are mounted back to back in the central portion of the housing, while the rotor means 124 are mounted in spaced relation outside of the stator means, with their pockets facing toward the corresponding pockets of the stators. The first stator means is mounted with its planar flange 138 clamped between the first end wall 112 and the annular flanged spaced means 168. The second stator means is correspondingly clamped with its planar outwardly extending flange 138 clampled between the annular flanged spacer means 168 and the second end wall 114. The clamping can be by conventional means such as bolts 174, for example. The two stator means have the plurality of walls dividing up their single annular into small pockets as was described in connection with FIGS. 1 and 2. There are also a plurality of drilled openings through the spacing walls, such as 154, so that liquid can flow from the back wall 132 of the stator through these openings 154 into the annular space which is divided up into pockets by the walls 56 as shown in FIG. 2.

Each of the back surfaces 132 of the stators has a planar sealing surface 151 carrying a sealing means 152. The space defined by the two back walls 132 and the spacer means 168 form an annular cavity which is the inlet annular space 180. As shown by the arrow 182 the brake liquid is supplied through the opening 170 into the annular input space 180, which liquid flows through the openings 154, into the annular cavity comprising the pockets 57 and 59.

The two rotors 124 are mounted on the shaft 116 and are locked by means of keys 126. They are reversed end for end so that their pockets are facing inward and are spaced on the shaft so as to provide the gaps 162 which correspond to the gaps 62 of FIG. 3. Liquid entering the space 180 flows through the opening 154 into the pockets 157 in the stator and 159 in the rotor out through the annular gap 162 and through the annular space 137 between the overhanging circumferential lip 136 of the stator and the circumferential surface of the rotor. The gap 137 is of such a selected dimension so that there is the proper back pressure offered by the flow of liquid through that gap, so as to properly meter the rate of flow of liquid.

The back surface 122 of the two rotors and the inner surfaces of the end plates 112 and 114 define two outlet annular spaces 184 and 186, which are connected by outlet conduits 172 and 172'. Liquid which flows in accordance with arrow 182 into the opening 170 into the inlet annular space 180, flows through the openings 154 into the pockets, out through the circumferential gap 137 and into the outlet annular spaces 184 and 186, and through the outlet conduits 172 and 172' in accordance with arrows 188.

It is thus seen that by designing the physical dimensions of the rotors and stators, the two stators can be held by flanges an identical position but with the pockets of the stators facing outwardly as in FIG. 5 or inwardly as in FIG. 3, with the rotors in corresponding positions, simply by removing the second end wall 114 and removing the four elements, 122, 132 and replacing them on the shaft in the proper axial location. By this simple expedient and without further construction effort, the brake shown in FIG. 5 can be run in one direction, or, when assembly is as in FIG. 3 it can be run in the opposite direction of rotation, to match the particular direction of rotation of the prime mover from which it is to be driven.

While the invention has been described with a certain degree of particularity it is manifest that many changes may be made in the details of construction and the arrangement of components. It is understood that the invention is not to be limited to the specific embodiments set forth herein by way of exemplifying the invention, but the invention is to be limited only by the scope of the attached claim or claims, including the full range of equivalency to which each element or step thereof is entitled. For example, spacers 68 and/or end wall housings 14 may be rotated to various positions to align the inlets and outlets for hydraulic fluid as desirable to accommodate piping and location of the equivalent.

What is claimed:

1. A hydromatic brake system, including:

housing means having a separate first end wall, intermediate cylindrical spacer, and separate second end wall;

shaft means rotatably supported in said housing means;

first and second rotor-stator sets comprising:

individual first and second brake rotors means each identically constructed and having a single annular liquid space with a plurality of webs defining a plurality of pockets, said webs leading in the direction of rotation, each having an outer peripheral surface, individual first and second brake stator means each identically constructed and having a single annular liquid space substantially identical to that of said annular space of said rotors with a plurality of webs defining a plurality of pockets, said webs leading in a direction opposite to the direction of rotation of said rotor, a conduit passing through each of said webs in said stator to provide communication from a back surface thereof to each of said pockets, each stator having an outwardly extending circular seal lip means on said back surface, an outwardly extending circumferential planar flange, and an inner peripheral rim axially extending, on the side of said liquid space, from the outer rim of said stator;

said first stator assembled such that its said flange is sealable retained between said first end wall and said spacer with its liquid space facing said first end wall;

said second stator assembly such that its said flange is sealably retained between said spacer and said second end wall with its liquid space facing said second end wall, said planar circular seal lip means of said first and second stator means in contact back to back and sealed by said planar circular sealing means, the back surfaces of said first and second stator means and said spacer defining an annular inlet space;

said first and second rotor means spacably attached to said shaft with the respective pockets facing their respective stator pockets, the back surface of said first rotor means and said first end wall defining a first annular outlet space, the back surface of said second rotor means and said second end wall defining a second annular outlet space, said outer peripheral surfaces of each said rotor positioned opposite said inner peripheral rim of each respective stator with a selected small radial clearance therebetween to maintain a substantially fixed liquid back pressure in said pockets; and means to supply a continuous flow of hydraulic liquid to said annular inlet space, and means to remove said liquid from said annular outlet spaces.

* * * * *